April 24, 1956 W. F. BUNSEN ET AL 2,743,163
INERT GAS GENERATOR
Filed Feb. 18, 1952 3 Sheets-Sheet 1

INVENTORS
William F. Bunsen, John W. Baxter,
John C. Fischer & Wesley W. Vyvyan
BY
Wm. H. Dean
Agent

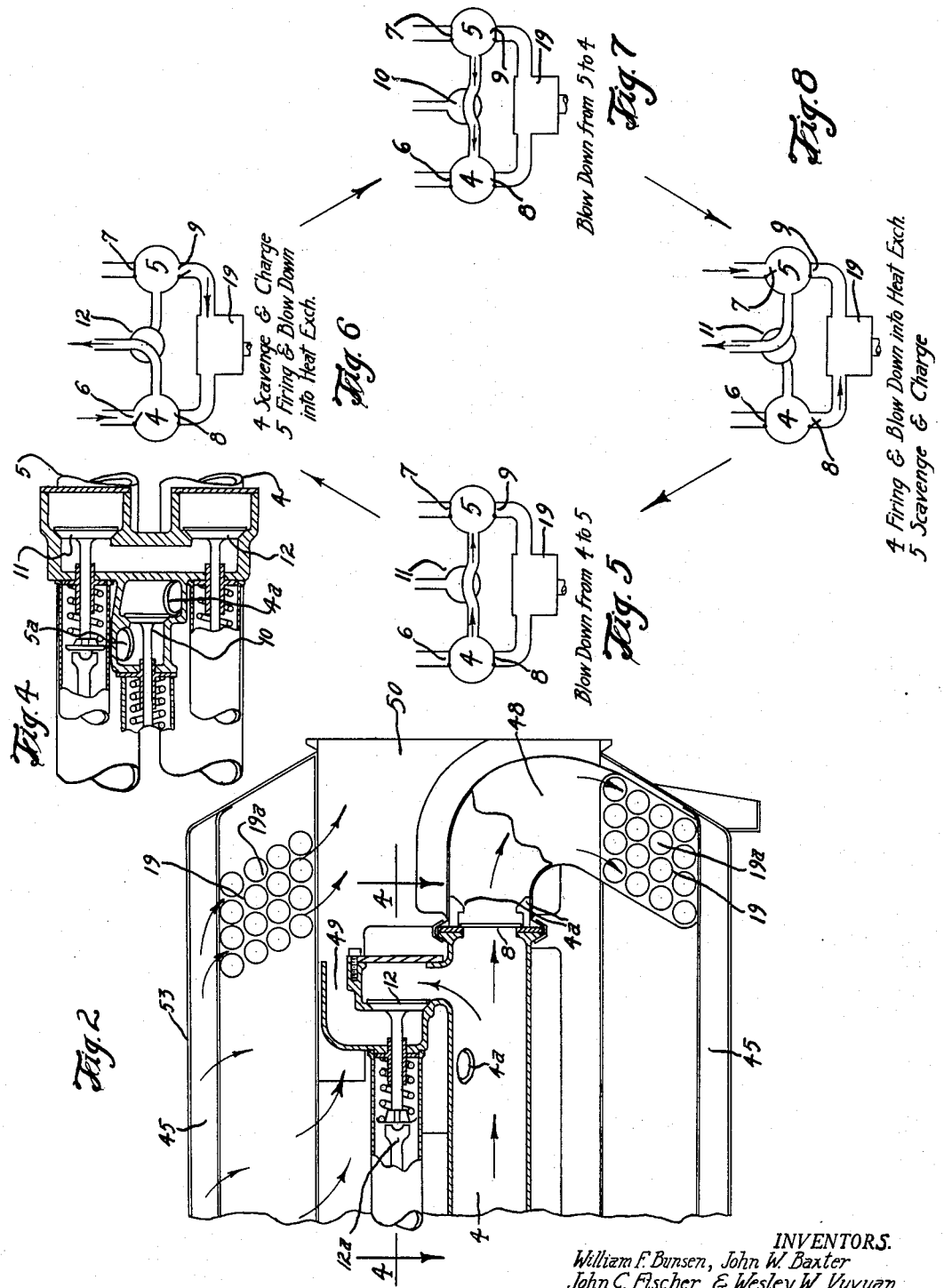

United States Patent Office 2,743,163
Patented Apr. 24, 1956

2,743,163

INERT GAS GENERATOR

William F. Bunsen, John W. Baxter, John C. Fischer, and Wesley W. Vyvyan, San Diego, Calif., assignors to The Ryan Aeronautical Co., San Diego, Calif., a corporation of California Application February 18, 1952, Serial No. 272,064

8 Claims. (Cl. 23—281)

Our invention relates to an inert gas generator and the objects of our invention are:

First, to provide a combustion type gas generator adapted to produce and deliver an inert gas for purging of aircraft fuel tanks, fuel tank cavities and other areas within an aircraft or other locality wherein such gas may be used.

Second, to provide an inert gas generator of this class which produces an inert gas and also cools, cleans and dehumidifies said gas in addition to removing substantially all of the corrosive elements therefrom.

Third, to provide an inert gas generator of this class which uses charge air from the conventional aircraft engine compressor or any other suitable source for compressed air.

Fourth, to provide a generator of this class having a novel arrangement of combustion chambers for efficiently producing inert gas from the conventional aircraft fuel supply.

Fifth, to provide an inert gas generator of this class having a novel arrangement of combustion chambers wherein intercommunication of said chambers permits pressure charging of one chamber from another chamber previous to each firing cycle whereby an increased compression ratio is accomplished attaining greater compression than that provided by the charge air entering the combustion chambers.

Sixth, to provide a generator of this class having means for introducing charge air to the combustion chambers at a low temperature.

Seventh, to provide an inert gas generator of this class having a novel combination of a cooling air fan and turbine axially connected providing motive power for the fan used to drive the cooling air through the heat exchangers of the generator while actual flow of inert gas through the turbine rotates the fan and causes a reduction in the temperature of the gases flowing through the turbine resulting in dehumidification of said gases.

Eighth, to provide an inert gas generator of this class having automatic pressure responsive control which effectively prevent the delivery of combustible gas therefrom.

Ninth, to provide an inert gas generator of this class which is almost entirely automatic with the exception of a single switch for initiating and stopping the operation thereof.

Tenth, to provide an inert gas generator of this class which is capable of withstanding extreme conditions of pressure, temperature and acceleration.

Eleventh, to provide an inert gas generator of this class which is very efficient in maintaining a very low percentage of oxygen concentration in the inert gas delivered thereby.

Twelfth, to provide an inert gas generator of this class which is substantially explosion-proof due to automatic means adapted to prevent injection of combustible gases into the combustion areas therein during the existence of temperatures in the excess of any predetermined value.

Thirteenth, to provide a generator of this class having means for automatically reigniting combustion therein in case of a temporary malfunction due to low charge air supply.

Fourteenth, to provide an inert gas generator of this class which is capable of being readily and easily started at substantial altitude and is also capable of furnishing its own supply of cooling air during operation thereof at ground level and in static position.

Fifteenth, to provide an inert gas generator of this class having combined combustion chamber and valve means adapted to operate efficiently as a thrust producer, and Sixteenth, to provide an inert gas generator of this class which is very simple and economical of construction, efficient in operation and which will not readily deteriorate or get out of order.

With these and other objects in view as will appear hereinafter, our invention consists of certain novel features of construction combination and arrangement of parts and portions as will be hereinafter described in detail and particularly set forth in the appended claims, reference being had to the accompanying drawings and to the characters of reference thereon, forming a part of this application in which:

Fig. 2 is a longitudinal fragmentary sectional view taken on the same plane as Fig. 1 and showing the opposite end of our inert gas generator from that shown in Fig. 1.

Fig. 3 is a diagrammatic view of our inert gas generator complete with controls.

Fig. 4 is a fragmentary sectional view taken from the line 4—4 of Fig. 2.

Fig. 5 is a diagrammatic illustration of a portion of one combustion cycle performed by our inert gas generator.

Fig. 6 is a similar view to Fig. 5 showing a successive cycle portion performed by our inert gas generator.

Fig. 7 is a similar view to Figs. 5 and 6 showing a portion of a cycle subsequent to that shown in Fig. 6; and Fig. 8 is another view showing diagrammatically the successive cycle operation to that shown in Fig. 7 of the drawing.

Similar characters of reference refer to similar parts and portions throughout the several views of the drawings.

Figure 1:
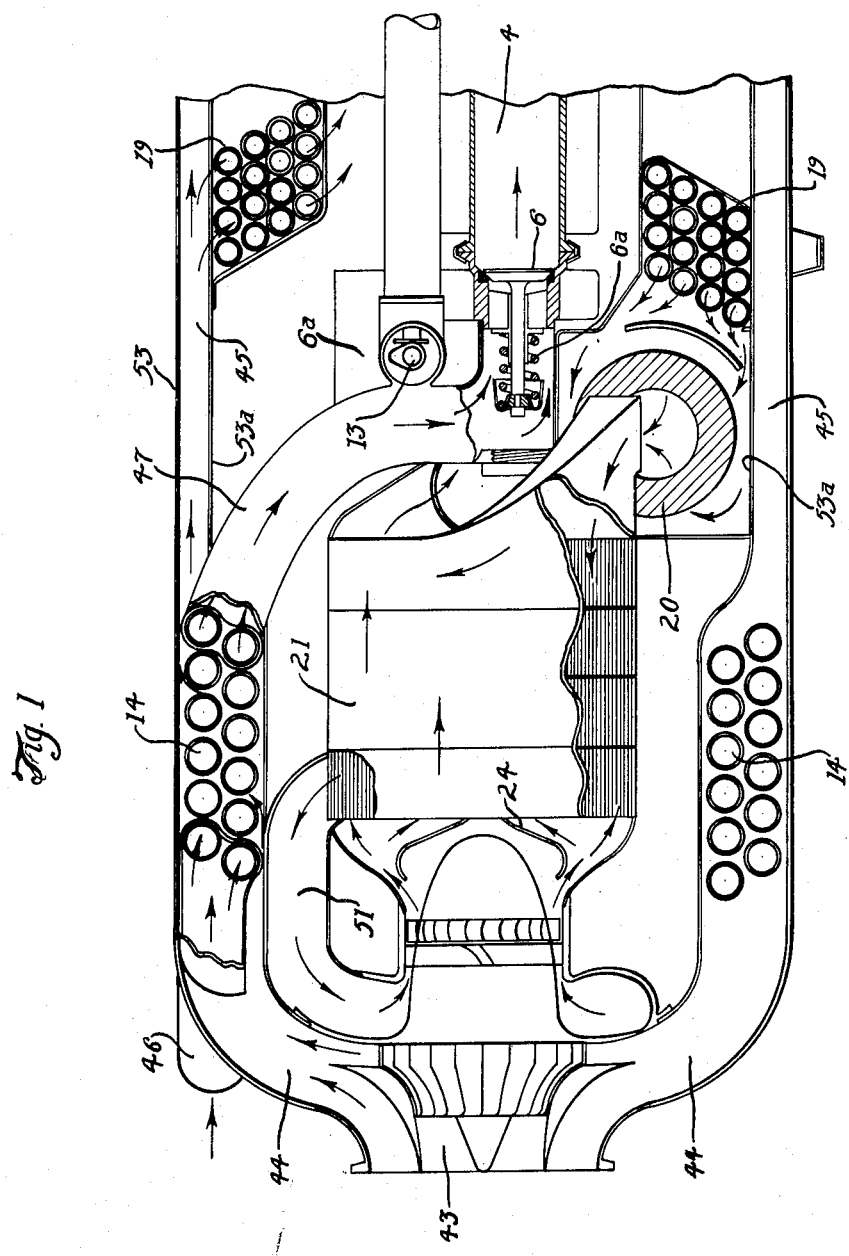
Fig. 1 is a fragmentary longitudinal sectional view of our inert gas generator.

The starting ignition coil 1, variable speed motor 2, fuel pump and injector 3, combustion chambers 4 and 5, combustion chamber inlet valves 6 and 7, combustion chamber outlet valves 8 and 9, combustion chamber blowdown valve 10, combustion chamber exhaust valves 11 and 12, cam 13, charge air precooler 14, spark plugs 15 and 16, fuel injector nozzles 17 and 18, heat exchanger 19, purge gas cleaner 20, regenerator 21, turbine 22, cooling fan 23, snow remover 24, condensate sumps 25, 26, 27 and 28, condensate tubes 29, 30, 31 and 32, inert gas outlet 33, overboard gas tube 34, overboard control valve 35, operators control switch 36, pressure responsive speed control 37, thermal control switch 38, pressure responsive control 39, fuel air ratio control 40, pressure regulator 41, fuel shut off valve 42, cooling air inlet 43, cooling air conductors 44 and 45, charge air inlet 46, charge air conductor 47, hot gas conductor 48, combustion chamber exhaust tube 49, air, gas and snow exhaust tube 50, turbine inlet conductor 51, turbine outlet conductor 52 and the casing 53 constitute the principal parts and portions of our inert gas generator.

Our inert gas generator as shown diagrammatically in Fig. 3 of the drawings employs hollow cylindrical combustion chambers 4 and 5 having inlet valves 6 and 7, respectively, and outlet valves 8 and 9, respectively. These combustion chambers 4 and 5 receive cold charge air through the conductor 47 which extends through the heat exchanger 14 to the charge air inlet 46 which communicates with the conventional aircraft engine compressor which furnishes a supply of compressed air to said inlet 46. The heat exchanger 14 is a charge air precooler adapted to cool the air entering the combustion chambers 4 and 5 and cooling air circulated through this heat exchanger 14 is supplied by the fan 23 operated by the turbine 22 and the supply of air to the fan 23 is preferably ram air conducted by the conductor 43 axially of the fan 23. The conductor 44 intercommunicates with the fan 23 and the heat exchanger 14 while the cooling air conductor 45 extends from the heat exchanger 14 to the heat exchanger 19 which cools hot gas emanating from the combustion chambers 4 and 5 through the hot gas conductor 48. This hot gas conductor 48 extends through the heat exchanger 19 and the cooling air admitted through the conductor 45 passes around the hot air conductor 48 while the tubes 29, 30, 31 and 32 supply condensate to the exterior of the hot gas conductor at its entrance into the heat exchanger 19, whereby the heat of vaporization effect provides considerable cooling of the gases as they enter the heat exchanger 19 at the downstream end thereof as indicated by the flow arrows in the diagrammatic view of Fig. 3. It will be noted that the hot gas conductor proceeds forwardly in convolution form as shown in Figs. 1 and 2 of the drawings toward the cooling air conductor 45 and the heat exchanger at its hot gas conductor portion vents into the purge gas cleaner 20 by means of the conductor portion 20a. This purge gas cleaner 20 is similar in construction and method of operation to the subject matter of the patent application of William F. Bunsen, Serial No. 243,836, filed August 27, 1951. Condensate from the heat exchanger 19 and the purge gas cooler 20 is drained into the sumps 25 and 26 respectively and is conducted by means of a pressure differential through the tubes 29 and 30 as hereinbefore described to the hot gas conductor at the entrance thereof into the heat exchanger 19. The purge gas cooler 20 is provided with an outlet conductor 20b which communicates with the interior of the regenerator. This conductor 20b extends through the regenerator into communicative relationship with the tube 22a which extends to the inlet side of the turbine 22. This turbine 22 is a high speed turbine having a shaft 22b fixed to the fan 23 and down stream from this turbine 22 is provided the casing portion 22c which communicates with the interior of the regenerator 21 around the gas conducting tube 20b. Internally of the casing 22c is a snow removing cone 24 having a tube 24a communicating with the downstream end thereof and extending through the regenerator 21 to the cooling air and exhaust outlet 50. The sumps 27 and 28 communicate with the lower casing portions at the inlet side of the turbine 22 and the regenerator 21 respectively and the conductor tubes 31 and 32 are connected therewith for the purpose of removing condensate from the sumps 27 and 28 to the heat exchanger 19 as hereinbefore described. It will be noted that a pressure differential exists between the sumps 25, 26, 27 and 28 and the outlet ends of the tubes 29, 30, 31 and 32 whereby condensate is pumped by pressure into the heat exchanger 19 as hereinbefore described. The regenerator is provided with a purged gas outlet tube 33 having a branch conductor 34 which serves as the overboard gas tube, the operation of which is controlled by the overboard control valve 35 which is a pressure sensitive valve adapted to close the tube 35 and open the tube 34 when the pressure drops below a predetermined level or until the pressure rises to a predetermined level. As shown in Figs. 1 and 2 of the drawings, our inert gas generator is a compact unit having the turbine 22 and fan 23 centrally thereof whereby the cooling air inlet 43 is foremost and the charge air supply opening 46 is foremost and adapted to receive compressed air from the conventional aircraft engine compressor. The cooling air conductor 45 is in the form of an annulus between the outer casing 53 and the inner casing 53a. The heat exchangers 14 and 19 are formed of tubular convolutions in which air and gases are conducted respectively and as shown in Fig. 1 of the drawings the forward portions of the casing 53 and the inner casing 53a form an annulus in which the convolutions of the heat exchanger 14 are positioned while the heat exchanger 19 incorporating tubular convolutions is positioned inwardly of the inner casing 53a surrounding the combustion chambers 4 and 5 and the valve mechanism cooperating therewith. The combustion chambers 4 and 5 as shown in Figs. 3 and 4 of the drawings are similar and are provided with inlet valves 6 and 7 respectively communicating with the charge air conductor 47. The combustion chamber 4 as shown in Figs. 1 and 2 of the drawings is provided with the inlet valve 6 having a preloaded spring 6a adapted to maintain the same closed against pressure within the charge air inlet tube 47. The valve 6 is adapted to be blown open by the pressure of the air in the tube 47 for charging the combustion chamber 4 and the outlet valve 8 is a flutter type valve adapted to reciprocate within limits provided by the fingers 8a shown in Fig. 2 of the drawings. This valve 8 operates by reciprocal pressure in the combustion chamber 4 and the hot gas conductor 48 respectively which is directly communicating with the tubular convolutions 19a internally of the heat exchanger 19. Communicating with the combustion chamber 4 is the exhaust valve 12 which is a spring loaded poppet valve operated by the cam 13 engaging the push rod 12a. This exhaust valve 12 communicates with the combustion chamber exhaust tube 49 which also communicates with the exhaust valve 11 shown in Fig. 4 of the drawings which provides an exhaust outlet for the combustion chamber 5. The blowdown valve 10 intercommunicates with both the chambers 4 and 5 as shown in Fig. 4 of the drawings and this blowdown valve 10 is a poppet valve of spring loaded arrangement operated by a lobe on the cam 13 in timed relationship with the valves 11 and 12 hereinbefore described. Communicating with opposite sides of this blowdown valve 10 are the ports 4a and 5a in the side walls of the combustion chambers 4 and 5. It will be noted that the air, gas and snow exhaust tube 50 is centrally located within the inner gas generator and provides an overboard exhaust for gases passing out of the exhaust tube 49 also provides an exhaust for the cooling air passing through the heat exchanger 19 from the tube 45. This air, gas and snow exhaust tube 50 also provides an outlet for the evaporated condensate delivered by the tubes 29, 30, 31 and 32 onto the hot gas conductor 48 in the heat exchanger 19 and the tube 24a from the snow remover 24 downstream of the turbine 22 empties into the exhaust tube 50.

The operators control switch 36 is adapted to initiate and discontinue operation of our inert gas generator at the will of the operator. When this switch 36 is closed, it conducts electricity from the battery 36a to the fuel air ratio control 40 by means of the conductor 36b. In series with this fuel air ratio control 40 is the thermal control switch 38, thermally associated with the hot gas conductor 48 at the outlet of the combustion chambers 4 and 5. This thermal switch 38 is connected by means of the conductor 38a to the control 40 and by means of the conductor 38b to the starting ignition coil 1. Electrically connected with the starting ignition coil 1 are the spark plugs 15 and 16 communicating with the interior of the combustion chambers 4 and 5. The fuel pump and injector 3 is provided with tubular conductors 3a and 3b connected with the nozzle 17 and 18 respectively which communicate with the interior of the combustion chambers 4 and 5 respectively. This fuel pump and injector 3 is controlled by the fuel air ratio control 40 which is a conventional control similar to such devices on aircraft carburetors or the like. The fuel shutoff valve 42 is provided with an inlet tube 42a adapted to receive fuel from the conventional aircraft fuel tank supply and is provided with an outlet tube 42b communicating with the fuel pump and injector 3. This fuel pump and injector 3 is driven by the shaft 3c extending through the valve operating mechanism 6a and which is connected to the extending shaft 2a of the variable speed motor 2. Thus, the motor 2, valve operating mechanism 6a which controls the operation of the valves 10, 11 and 12 and the fuel pump and injector 3 all operate together. The pressure responsive speed control 37 is electrically connected with the pressure responsive control 39 by means of the conductors 37a and 37b. The pressure responsive control 39 is provided with a pair of communicating tubes 39a and 39b which communicate with the interior of the casing 22c and the tube 22a respectively hereinbefore described in Fig. 3 of the drawings.

It will be noted that the valve operating mechanism 6a operates the cam shaft 13 and that the valves 10, 11 and 12 as shown in Figs. 2 and 4 of the drawings are not shown in the diagrammatic view of Fig. 3 in order to facilitate the illustration.

The operation of our inert gas generator is substantially as follows: The operator closes the switch 36 which conducts electrical energy to the fuel air ratio control 40. This control 40 automatically conducts electrical energy to the conductor 38a in the event charge air within the conductor 47 is of sufficient density to properly support combustion in the combustion chambers 4 and 5. As electrical energy is conducted to the thermal switch 38 which is a normally closed switch current is immediately supplied to the ignition coil 1 which causes the spark plugs 15 and 16 to provide a continuous arc within the combustion chambers 4 and 5. Electrical energy is also conducted by means of the conductors 38c and 37a to the motor 2 which causes it to rotate the shaft 2a and the shaft 3c setting in operation the motor of the valve mechanism 6a and the fuel pump and injector 3. It will be here noted that the fuel pump and injector is so arranged that it will not start injection through the nozzle 17 and 18 until the operating shaft 3c thereof has reached a certain revolving speed and this fuel pump and injector 3 responds directly according to the control 40 so that fuel will not be injected unless the charge air pressure reaches a certain value. When the charge air pressure is sufficient and the speed of the fuel pump and injector 3 reaches a certain value the injector 17 and 18 inject fuel into the combustion chambers 4 and 5 upstream from the spark plugs 15 and 16 which ignites the same causing combustion therein. Combustion in the chambers 4 and 5 forces the valves 8 and 9 open causing inert gas to pass into the hot gas conductor 48 and through the heat exchanger 19 and purge gas cleaner 20 as hereinbefore described. The valves 8 and 9 operate as reciprocal valves responsive to the pressure in the heat exchanger 19 and the combustion chambers 4 and 5. When the peak pressure of combustion in the chambers 4 and 5 is reached, the valves 8 and 9 open and subsequently close when a balance of pressure has been reached wherein the pressure in the combustion chambers 4 and 5 subsides below the pressure value in the heat exchanger 19. It will be noted that the diagrammatic illustrations of cycle operations in Figs. 5, 6, 7, and 8 disclose a single valve means which corresponds to the valves 10, 11 and 12 hereinbefore described. The general cycling operation of combustion in the combustion chambers 4 and 5 involves firing the charge of fuel in one of the chambers which causes concurrent delivery of the products of combustion into the hot gas conductor 48. During this time the other chamber is scavenging and exhausting into the exhaust outlet 49 and also receiving a charge of fresh air through the conductor 47 and the respective inlet valve. Subsequently the chamber in which the charge has been previously fired reaches a balance with the heat exchanger causing closure of the outlet valve, then the blowdown cycle occurs wherein the intermediate valve 10 is open permitting residual pressure to escape from the previously fired chamber into the chamber which has been scavenged and charged which raises the pressure in the charged chamber ready for the firing operation. The second chamber is then fired by means of the ignition in one of the spark plugs causing gas to be dispensed into the heat exchanger 19 through the hot gas conductor 48 and concurrently the chamber which first fired is scavenged and charged by means of charge air entering the conductor 47 and exhaust gas passing out through the conductor 49. The process is then reversed from one chamber to the other for blowdown into the chamber which first fired. Referring now particularly to Fig. 5 it will be seen that the valve 10 is in open position causing direct communication between the combustion chambers 4 and 5. The valves 6 and 7 and 8 and 9 are closed. Thus the chamber 5 which has been scavenged and charged receives an additional charge from the chamber 4 increasing the pressure in the chamber 5. Proceeding to the cycle position shown in Fig. 6, it will be seen that the chamber 5 is then fired which causes the valve 9 to be blown open and a charge of hot gas to be dispensed into the heat exchanger 19. Very rapidly the pressures balance off and the valve 9 closes with resultant slightly lower pressure in the combustion chamber 5 than in the heat exchanger 19. During combustion in the chamber 5 the chamber 4 is scavenged by means of the open position of the valve 12 and is charged by means of the open position of the valve 6 which is blown open under pressure of the compressed charge air in the conductor 47. It will be noted that after the combustion chambers 4 and 5 reach a certain temperature the timing of combustion is accomplished by the fuel pump and injector 3 which injects the fuel at the critical time. Proceeding to Fig. 7 of the drawings, it will be seen that subsequent to the firing in the chamber 5, the valve 10 is opened by means of the cam 13 causing the residual gas under pressure to pass into the chamber 4 augmenting its charge pressure at which time the injector nozzle 17 delivers a charge of fuel causing combustion in the chamber 4 and dispensation of hot gas into the heat exchanger 19, while concurrently the combustion chamber 5 is charged and scavenged by means of inlet of charge air through the valve 7 and outlet of exhaust gas for scavenging through the valve 11.

It will be here noted that the cycling operation of the combustion chambers 4 and 5 may provide considerable thrust of gas in the hot gas conductor 48, thereby building up pressure in the heat exchanger 19, purge gas cleaner 20, regenerator 21 and inlet casing of the turbine 22. Thus the turbine 22 is driven at fairly high velocity causing conversion or cooling of the gases due to work absorbed by the fan 23 resulting in the formation of snow from the moisture remaining in the hot gases after passing through the heat exchanger 19, cleaner 20 and regenerator 21. The cool gas is then conducted through the regenerator 21 around the tube 20b and passes backwardly through the outlet tube 33 for use around fuel tanks or other places as desired. It will be noted that during initial operation of our inert gas generator, the gas which is delivered to the outlet tube 33 is diverted overboard through the tube 34 by means of the pressure sensitive valve 35. It is obvious that initial combustion under fairly low temperatures in the combustion chambers 4 and 5 is not sufficiently complete to maintain the oxygen content at a minimum, therefore the gases delivered from the regenerator 21 to the tube 33 are directed overboard by means of the valve 35 until sufficient pressure is reached within the regenerator 21 which corresponds with efficient combustion in the combustion chambers 4 and 5. When sufficient pressure has been reached within the regenerator 21, the valve 35 closes to the position as shown in Fig. 3 of the drawings permitting the substantially inert cooled and dehumidified gas to pass through the outlet tube 33 and to positions in which it may be used. In the event incomplete combustion occurs in the combustion chambers 4 and 5 and the pressure drops the valve 35 immediately causes overboard diversion of the gases preventing combustible gases from entering positions within the airplane structure around the fuel cells or other locations. As the temperature drops in the hot gas conductor 48 due to incomplete combustion, this switch closes and the spark plugs 15 and 16 again resume operation in order to insure combustion due to a possible temperature drop in the combustion chambers 4 and 5. If the charge air pressure in the conductor 47 drops, the fuel pump and injector 3 automatically stops operation preventing raw fuel from being injected into the combustion chambers 4 and 5 without sufficient oxygen to sustain combustion. When normal charge air pressure and density is resumed after an unexpected deficiency, the spark plugs 15 and 16 continue operation until the temperature rises sufficiently in the hot gas conductor 48 to open the switch 38. The valve 35 operates in the same manner hereinbefore described in order to prevent purge gas from passing through the tube 33 until the pressure reaches a safe level at which time the valve 35 closes the overboard gas tube 34 and permits the gas to pass through the tube 33. It will be noted that the pressure responsive control 39 senses the pressure differential across the turbine wheel 22 by means of the tubes 39a and 39b and in accordance therewith relays an impulse to the pressure response and speed control 37 for increasing or decreasing the speed of the motor 2 in accordance with the increase or decrease in the demand for purge gas. If the use of purge gas is increased by leakage or other influences, the pressure drop at the outlet of the turbine wheel 22 causes the speed of the motor 2 to increase and add more fuel due to increase of the speed of the fuel pump and injector 3 connected therewith. The increased speed of the turbine 22 as a result of increased combustion in the chambers 4 and 5 and corresponding pressure in the system causes the fan 23 to be driven at a higher speed with a corresponding cooling of the charge air by means of the heat exchanger 14 and also the hot gas conductor 48 within the heat exchanger 19. As shown in Fig. 3 of the drawings the pressure regulator 41 is a valve disposed in the charge air conductor 47 upstream from the fuel air ratio 40. This pressure regulator 41 may be employed to regulate the volumetric delivery of purge gas to the inert gas outlet 33 if desired. In operation this pressure regulator 41 upstream of the fuel air ratio control 40 in reducing the flow of air through the charge conductor 47 causes the fuel pump and injector 3 to reduce its charge in response to the fuel air ratio control 40 or causes it to increase its charge with the opening of the pressure regulator 41, which permits greater flow through the charge conductor 47. It will be noted that during operation of the heat exchanger 19 the purge gas cooler 20 and the regenerator 21 condensate from the gas is utilized in an efficient manner for cooling the hot gas conductor 48 at its entrance into the heat exchanger 19 and the condensate from the sump 27 at the inlet of the turbine wheel 22 is also used in a similar manner while the snow hereinbefore mentioned, which accumulates at the outlet of the turbine 22, is disposed of by means of the tube 24a extending through the regenerator 21 and into the exhaust conductor 50, which sufficiently warms the tube 24a to prevent clogging thereof with the snow and thus substantially all of the moisture content of the purge gas is removed and disposed of efficiently and the heat exchanger thereof is fully taken advantage of within the heat exchanger 19.

Though we have shown and described a particular construction, combination and arrangement of parts and portions, we do not wish to be limited to the particular construction, combination and arrangement but desire to include in the scope of our invention, the construction, combination and arrangements substantially as set forth in the appended claims.

Having thus described our invention, what we claim as new and desire to secure by Letter Patent is:

1. In an inert gas generator, a plurality of closed hollow combustion chambers having inlets at one end and outlets at the other end, a charge air conductor communicating with the inlet ends of said combustion chambers, valves in said inlets, valves in said outlets, a hot gas conducting means downstream of said outlet valves, blowdown valve means providing intercommunication between said combustion chambers, exhaust valve means communicating with said combustion chambers for purging the same, fuel injection means in said combustion chambers, ignition means in said combustion chambers, and fuel ignition means timed with said injection means and with said blowdown valve means a fuel air ratio control communicating with the inlet of said combustion chambers controlling said fuel injection means in accordance with the air charge entering said combustion chambers, means for timing the operation of said blowdown valve and said scavenging exhaust valve, the cycle for each chamber including an air charging stage, an intermediate stage and a high pressure burning-exhaust stage, said blowdown valve being open during said intermediate stage for each chamber a heat exchanger communicating with the outlet of said combustion chambers during said high pressure burning-exhaust stage, a purge gas cleaner communicating with said heat exchanger downstream thereof, and a pressure responsive overboard control valve downstream from said purge gas cleaner adapted to divert gas overboard when present below a certain pressure.

2. In an inert gas generator, a plurality of closed hollow combustion chambers having inlets at one end and outlets at the other end, a charge air conductor communicating with the inlet ends of said combustion chambers, valves in said inlets, valves in said outlets, a hot gas conducting means downstream of said outlet valves, blowdown valve means providing intercommunication between said combustion chambers, exhaust valve means communicating with said combustion chambers for purging the same, fuel injection means in said combustion chambers, ignition means in said combustion chambers, and fuel ignition means timed with said injection means and with said blowdown valve means a fuel air ratio control communicating with the inlet of said combustion chambers controlling said fuel injection means in accordance with the air charge entering said combustion chambers, means for timing the operation of said blowdown valve and said scavenging exhaust valve, the cycle for each chamber including an air charging stage, an intermediate stage and a high pressure burning-exhaust stage, said blowdown valve means being open during said intermediate stage for each chamber a heat exchanger communicating with the outlet of said combustion chambers during said high pressure burning-exhaust stage, a purge gas cleaner communicating with said heat exchanger downstream thereof, a pressure responsive overboard control valve downstream from said purge gas cleaner adapted to divert gas overboard when present below a certain pressure, a regenerator intermediate said purge gas cleaner and said overboard control valve and a turbine driven by exhaust gas from said exchanger, means to cool purge gas from said purge gas cleaner, said turbine having a driving connection with the last mentioned means.

3. In an inert gas generator, a plurality of closed hollow combustion chambers having inlets at one end and outlets at the other end, a charge air conductor communicating with the inlet ends of said combustion chambers, valves in said inlets, valves in said outlets, a hot gas conducting means downstream of said outlet valves, blowdown valve means providing intercommunication between said combustion chambers, exhaust valve means communicating with said combustion chambers for purging the same, fuel injection means in said combustion chambers, ignition means in said combustion chambers, and fuel ignition means timed with said injection means and with said blowdown valve means a fuel air ratio control communicating with the inlet of said combustion chambers controlling said fuel injection means in accordance with the air charge entering said combustion chambers, means for timing the operation of said blowdown valve and said scavenging exhaust valve, the cycle for each chamber including an air charging stage, an intermediate stage and a high pressure burning-exhaust stage, said blowdown valve means being open during said intermediate stage for each chamber a heat exchanger communicating with the outlet of said combustion chambers during said high pressure burning-exhaust stage, a purge gas cleaner communicating with said heat exchanger downstream thereof, a pressure responsive overboard control valve downstream from said purge gas cleaner adapted to divert gas overboard when present below a certain pressure, a regenerator intermediate said purge gas cleaner and said overboard control valve, a turbine downstream from said regenerator adapted to cool purge gas from said purge gas cleaner, a fan connected with said turbine and supplying cooling air to said heat exchanger, and a secondary heat exchanger for cooling charge air for said combustion chambers.

4. In an inert gas generator, a plurality of closed hollow combustion chambers having inlets at one end and outlets at the other end, a charge air conductor communicating with the inlet ends of said combustion chambers, valves in said inlets, valves in said outlets, a hot gas conducting means downstream of said outlet valves, blowdown valve means providing intercommunication between said combustion chambers, exhaust valve means communicating with said combustion chambers for purging the same, fuel injection means in said combustion chambers, ignition means in said combustion chambers, and fuel ignition means timed with said injection means and with said blowdown valve means a fuel air ratio control communicating with the inlet of said combustion chambers controlling said fuel injection means in accordance with the air charge entering said combustion chambers, means for timing the operation of said blowdown valve and said scavenging exhaust valve, the cycle for each chamber including an air charging stage, an intermediate stage and a high pressure burning-exhaust stage, said blowdown valve means being open during said intermediate stage for each chamber a heat exchanger communicating with the outlet of said combustion chambers during said high pressure burning-exhaust stage, a purge gas cleaner communicating with said heat exchanger downstream thereof, a pressure responsive overboard control valve downstream from said purge gas cleaner adapted to divert gas overboard when present below a certain pressure, a regenerator intermediate said purge gas cleaner and said overboard control valve, a turbine downstream from said regenerator adapted to cool purge gas from said purge gas cleaner, a fan connected with said turbine and supplying cooling air to said heat exchanger, a secondary heat exchanger for cooling charge air for said combustion chambers, and means for controlling the volume of charge air delivered to said combustion chambers in order to adjust the volume delivery of inert gas therefrom.

5. In an inert gas generator, a plurality of closed hollow combustion chambers having inlets at one end and outlets at the other end, a charge air conductor communicating with the inlet ends of said combustion chambers, valves in said inlets, valves in said outlets, a hot gas conducting means downstream of said outlet valves, blowdown valve means providing intercommunication between said combustion chambers, exhaust valve means communicating with said combustion chambers for purging the same, fuel injection means in said combustion chambers, ignition means in said combustion chambers, and fuel ignition means timed with said injection means and with said blowdown valve means a fuel air ratio control communicating with the inlet of said combustion chambers controlling said fuel injection means in accordance with the air charge entering said combustion chambers, means for timing the operation of said blowdown valve and said scavenging exhaust valve, the cycle for each chamber including an air charging stage, an intermediate stage and a high pressure burning-exhaust stage, said blowdown valve means being open during said intermediate stage for each chamber a heat exchanger communicating with the outlet of said combustion chambers during said high pressure burning-exhaust stage, a purge gas cleaner communicating with said heat exchanger downstream thereof, a pressure responsive overboard control valve downstream from said purge gas cleaner adapted to divert gas overboard when present below a certain pressure, a regenerator intermediate said purge gas cleaner and said overboard control valve, a turbine downstream from said regenerator adapted to cool purge gas from said purge gas cleaner, a fan connected with said turbine and supplying cooling air to said heat exchanger, a secondary heat exchanger for cooling charge air for said combustion chambers, means for controlling the volume of charge air delivered to said combustion chambers in order to adjust the volume delivery of inert gas therefrom, and a thermal switch downstream from said combustion chambers adapted to control the ignition means.

6. In a means for combustion for fuels, a plurality of closed combustion chambers, a charge air inlet for said combustion chambers communicating therewith, valves near the inlet ends of said combustion chambers adapted to close in response to pressure therein, valves at the outlets of said combustion chambers, gas conducting means communicating with said chambers downstream of said outlet valves, said outlet valves closing in response to pressure in said conducting means, purging exhaust valve means communicating with the interior of said combustion chambers and blowdown valve means providing intercommunication of said combustion chambers.

7. In a means for combustion for fuels, a plurality of closed combustion chambers, a charge air inlet for said combustion chambers communicating therewith, valves near the inlet ends of said combustion chambers adapted to close in response to pressure therein, valves at the outlets of said combustion chambers, gas conducting means communicating with said chambers downstream of said outlet valves, said outlet valves closing in response to pressure in said conducting means, purging exhaust valve means communicating with the interior of said combustion chambers and blowdown valve means providing intercommunication of said combustion chambers, and means for timing the operation of said purging exhaust valve means and said blowdown valve means so that one chamber after being purged and charged receives residual gases under pressure from another of said chambers for increasing the pressure of the charged chamber previous to firing.

8. In a means for combustion for fuels, a plurality of closed combustion chambers, a charge air inlet for said combustion chambers communicating therewith, valves near the inlet ends of said combustion chambers adapted to close in response to pressure therein, valves at the outlets of said combustion chambers, gas conducting means communicating with said chambers downstream of said outlet valves, said outlet valves closing in response to pressure in said conducting means, purging exhaust valve means communicating with the interior of said combustion chambers, blowdown valve means providing intercommunication of said combustion chambers, means for timing the operation of said purging exhaust valve means and said blowdown valve means so that one chamber after being purged and charged receives residual gases under pressure from another of said chambers for increasing the pressure of the charged chamber previous to firing, a heat exchanger communicating with the outlet of said combustion chambers adapted to cool the gas emanating therefrom, a gas cleaner communicating with the outlet of said heat exchanger, condensates sumps having tubular conductors extending therefrom connected with said heat exchanger, and said purge gas cooler adapted to conduct condensate to said heat exchanger for cooling gas emanating from said combustion chambers as it enters said heat exchanger.

References Cited in the file of this patent

UNITED STATES PATENTS

| | | |
|---|---|---|
| 1,838,477 | Elsea | Dec. 29, 1931 |
| 1,856,024 | Buchi | Apr. 26, 1932 |
| 1,952,005 | Willenborg | Mar. 20, 1934 |
| 1,964,620 | Cernock | June 26, 1934 |
| 1,987,631 | Noack | Jan. 15, 1935 |
| 2,037,158 | Doelling | Apr. 14, 1936 |
| 2,121,812 | Meininghaus | June 28, 1938 |
| 2,174,266 | Jackson et al. | Sept. 26, 1939 |
| 2,247,625 | Willenborg | July 1, 1941 |
| 2,369,698 | Willenborg | Feb. 25, 1945 |
| 2,375,834 | Walker | May 15, 1945 |
| 2,392,711 | Willenborg | Jan. 8, 1946 |
| 2,529,325 | Bohuslav | Nov. 7, 1950 |

FOREIGN PATENTS

| | | |
|---|---|---|
| 627,896 | Great Britain | Aug. 18, 1949 |